(12) United States Patent
Kim (10) Patent No.: US 9,326,023 B2
(45) Date of Patent: Apr. 26, 2016

(54) METHOD AND APPARATUS FOR DISPLAYING ELECTRONIC PROGRAM GUIDE OF RECORDED TRANSPORT STREAM FILE

(75) Inventor: Young-Jin Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1152 days.

(21) Appl. No.: 12/320,900

(22) Filed: Feb. 6, 2009

(65) Prior Publication Data

US 2009/0235310 A1    Sep. 17, 2009

(30) Foreign Application Priority Data

Mar. 17, 2008    (KR) .................. 10-2008-0024416

(51) Int. Cl.
*H04N 21/433*    (2011.01)
*H04N 21/44*    (2011.01)
*H04N 21/439*    (2011.01)
(Continued)

(52) U.S. Cl.
CPC ............ *H04N 21/4334* (2013.01); *G11B 27/11* (2013.01); *G11B 27/322* (2013.01); *H04N 5/76* (2013.01); *H04N 21/2383* (2013.01); *H04N 21/42615* (2013.01); *H04N 21/4331* (2013.01); *H04N 21/4332* (2013.01); *H04N 21/4335* (2013.01); *H04N 21/4341* (2013.01); *H04N 21/4343* (2013.01); *H04N 21/4345* (2013.01); *H04N 21/4351* (2013.01); *H04N 21/4382* (2013.01); *H04N 21/4392* (2013.01); *H04N 21/44004* (2013.01); *H04N 21/4622* (2013.01); *H04N 21/482* (2013.01); *H04N 9/8205* (2013.01)

(58) Field of Classification Search
CPC ............ H04N 21/433; H04N 21/4331; H04N 21/4332; H04N 21/4334; H04N 21/4385; H04N 21/4392; H04N 21/44004; H04N 21/4341; H04N 21/4343; H04N 21/4345
USPC .............................................. 725/40, 39, 142
See application file for complete search history.

(56) References Cited

U.S. PATENT DOCUMENTS 6,151,443 A * 11/2000 Gable et al. .................. 386/241
2003/0108331 A1 * 6/2003 Plourde et al. ................. 386/83

(Continued)

FOREIGN PATENT DOCUMENTS

| JP | 2004-7514 | 1/2004 |
|---|---|---|
| KR | 10-0518808 | 10/2005 |
| KR | 10-2007-0057293 | 6/2007 |
| KR | 10-2007-0063341 | 6/2007 |
| KR | 10-2007-0067428 | 6/2007 |

OTHER PUBLICATIONS

Azimi, Mehran et al. "Implementation of MPEG System Target Decoder." 2001. Canadian Conference on Electrical and Computer Engineering. vol. 2, pp. 943-946.*

(Continued)

*Primary Examiner* — Jeremy Duffield
(74) *Attorney, Agent, or Firm* — Harness, Dickey & Pierce, P.L.C.

(57) ABSTRACT

A method and apparatus for displaying an EPG of a recorded TS file. The method and apparatus enables a user to recognize in advance digital broadcasting content (i.e., broadcasting programs) recorded using the EPG of the recorded TS file by accumulatively storing EPG information of the corresponding broadcasting content when recording the respective broadcasting content transmitted from a plurality of broadcasting stations.

9 Claims, 5 Drawing Sheets

(51) Int. Cl.
*H04N 21/426* (2011.01)
*H04N 21/434* (2011.01)
*G11B 27/11* (2006.01)
*G11B 27/32* (2006.01)
*H04N 5/76* (2006.01)
*H04N 21/2383* (2011.01)
*H04N 21/4335* (2011.01)
*H04N 21/435* (2011.01)
*H04N 21/438* (2011.01)
*H04N 21/462* (2011.01)
*H04N 21/482* (2011.01)
*H04N 9/82* (2006.01)

(56) References Cited

U.S. PATENT DOCUMENTS

| 2003/0188307 | A1* | 10/2003 | Mizuno ............................ 725/28 |
| 2004/0017831 | A1* | 1/2004 | Shen et al. ..................... 370/486 |
| 2005/0207449 | A1* | 9/2005 | Zhang et al. ................... 370/486 |
| 2006/0159093 | A1* | 7/2006 | Joo et al. ........................ 370/390 |
| 2008/0062127 | A1* | 3/2008 | Brodersen et al. ............. 345/158 |

OTHER PUBLICATIONS

Korean Office Action mailed Mar. 11, 2014 in related Korean Application No. 10-2008-0024416.

* cited by examiner

FIG. 1

(Related Art)

FIG. 2

(Related Art)

METHOD AND APPARATUS FOR DISPLAYING ELECTRONIC PROGRAM GUIDE OF RECORDED TRANSPORT STREAM FILE

CROSS-REFERENCE TO RELATED APPLICATIONS

This application claims the benefit of Korean Patent Application No. 10-2008-0024416, filed Mar. 17, 2008, in the Korean Intellectual Property Office, the disclosure of which is incorporated herein by reference.

BACKGROUND

1. Field

One or more embodiments of the present invention relate to a method and apparatus for displaying an electronic program guide (EPG) of a recorded transport stream (TS) file, and more particularly, to a method and apparatus for displaying an EPG of a recorded TS file, which enables a user to recognize in advance digital broadcasting content (i.e., broadcasting programs) recorded using the EPG of the recorded TS file by accumulatively storing EPG information of the corresponding broadcasting content when recording the respective broadcasting content transmitted from a plurality of broadcasting stations.

2. Description of the Related Art

Presently, as digital broadcasting has been gradually spread in our daily life, user demand for diverse additional services due to the features of digital broadcasting, in addition to TV viewing with no noise and flicker, has been gradually increasing.

A representative feature of such digital broadcasting is to provide EPG information, which simply means a broadcasting program schedule. The range of such EPG information, in accordance with the transmission rate or transmission method of broadcasting stations transmitting the digital broadcasts, may be extended from simple information, such as a program broadcasting time, a program title, and channel, to detailed program information (e.g., the cast, plot, temporal background, and the like, of a drama), and so far as to Internet-connected information acquisition and electronic commerce during the viewing of TV or advertisement.

In one or more embodiments of the present invention, among the above-described additional services, a method of displaying an EPG of a recorded TS file will be described in detail. First of all, a conventional method of recognizing an EPG of a recorded TS file will be described.

Figure 1:
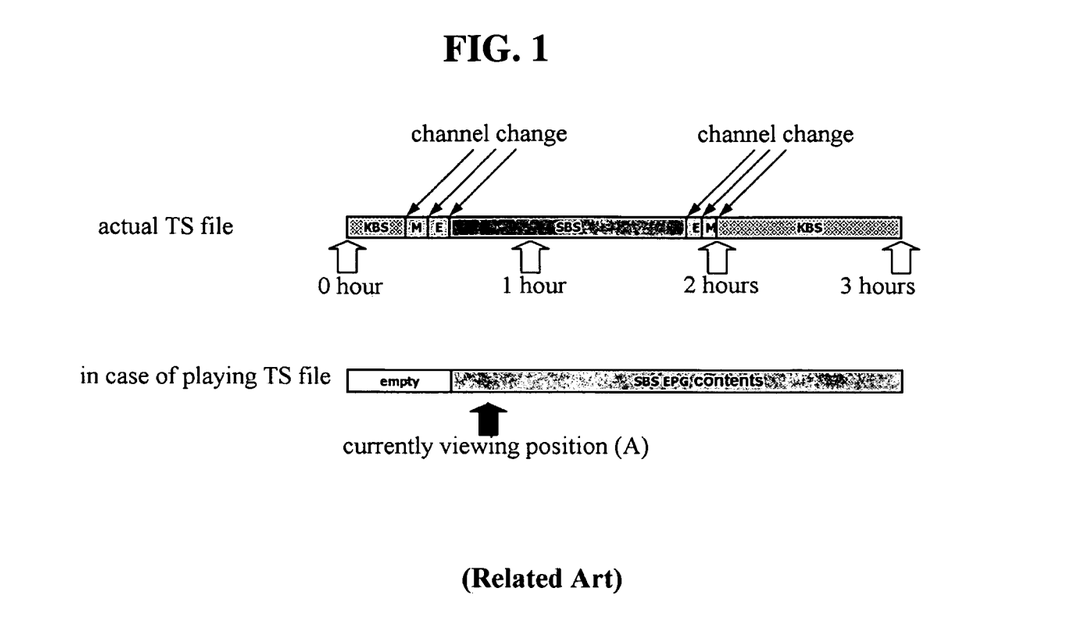
FIG. 1 illustrates an actual TS file and EPG information provided when a recorded TS file is played according to a conventional method of displaying an EPG of a recorded TS file.

FIG. 1 is a view illustrating an actual TS file and EPG information provided when a recorded TS file is played according to a conventional method of displaying an EPG of a recorded TS file.

Referring to FIG. 1, it can be recognized that recording was made with several times channel change in the order of →MBC→EBS→SBS→ . . . →KBS. If it is assumed that a time point for each channel change is a time point where broadcasting content is finished, a user could acquire seven or more EPG information files during the viewing of broadcasts for three hours. According to the conventional method, however, seven EPG information files are stored in different storage units. Accordingly, in the case of executing a specified TS playback file, only the EPG information file for the broadcasting content at a currently playing (viewing) time point is available.

Figure 2:
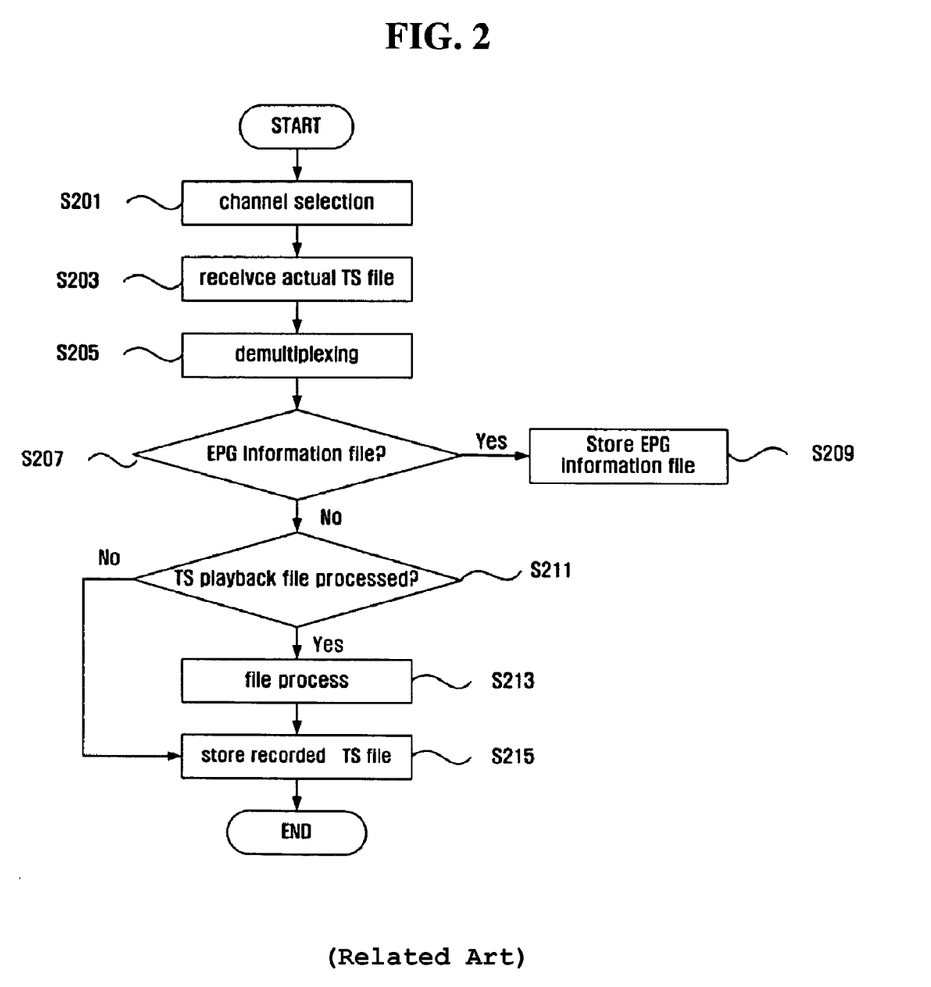
FIG. 2 illustrates a flowchart of a conventional method of displaying an EPG of a recorded TS file.

FIG. 2 is a flowchart illustrating a conventional method of displaying an EPG of a recorded TS file.

Referring to FIG. 2, the conventional method of displaying an EPG of a recorded TS file includes a user selecting a channel S201, receiving an actual TS file transmitted from the selected channel, dividing the received actual TS file into a video bitstream, an audio bitstream, a program specific information (PSI) session, and a program and system information protocol (PSIP) session through a demultiplexer S205, generating a TS playback file composed of the separated video bitstream and/or the audio bitstream (not illustrated), generating an EPG information file by extracting EPG information after parsing the separated PSI session and the PSIP session (not illustrated), judging whether the generated EPG information file exists S207, if the EPG information file exists, storing the EPG information file in an EPG information storage unit S209, judging whether to process the generated TS playback file S211, and if the processing of the generated TS playback file is required, processing the TS playback file into video/audio bitstream suitable to be displayed S213 and storing the processed video/audio bitstream as a recorded TS file S215, while if the processing of the generated TS playback file is not required, directly storing the TS playback file as the recorded TS file S215. In S209 to S215, the acquired EPG information file and the recorded TS file are stored in different storage units. Accordingly, when the recorded TS file is played as described above, only the EPG information file corresponding to the currently played broadcasting content among the stored EPG information files is provided to the user as the EPG information.

According to the conventional method of displaying an EPG of a recorded TS file, however, the TS playback file and the EPG information file are separately stored, and thus it is somewhat difficult to maintain and manage the files. Also, if even one EPG information file is lost, the corresponding EPG information cannot be provided using only the TS playback file.

In addition, in the case where a user intends to record an actual TS file that is transmitted from a broadcasting station, only one broadcasting content desired by the user may not be recorded, but undesired broadcasts existing before and after the broadcasting content to be recorded (e.g., an advertisement broadcast and a preview of the next broadcasting content) may be recorded together with the desired broadcasting content. Also, if the user misses the record time, a part of the broadcasting content may be omitted, and through a channel up/down operation during the recording, different channel broadcasts may be recorded. As described above, generally more than one EPG information file is required for one TS playback file. In other words, since only the EPG information of the broadcasting content being currently played is provided during the playback of the TS playback file, it is required to play the TS playback file from beginning to end in order to recognize all the broadcasting content stored in the TS playback file, and this causes great inefficiency.

SUMMARY

Accordingly, one or more embodiments of the present invention have been made to solve the above-mentioned problems occurring in the prior art, and an aspect of one or more embodiments is to provide a method of displaying an EPG of a recorded TS file, which enables a user to recognize in advance broadcasting content recorded in a file, in which a TS playback file and an EPG information file are processed together, by displaying EPG information of the recorded broadcasting content before playing the TS file.

Another aspect of one or more embodiments is to provide a method of displaying an EPG of a recorded TS file, which enables a user to recognize in advance all broadcasting content recorded in one TS playback file by accumulatively storing more than one EPG information file, which is required for the TS playback file, and by displaying all EPG information of the broadcasting content recorded in the TS playback file.

Still another aspect of one or more embodiments is to provide a method of displaying an EPG of a recorded TS file, which can improve the custody, management, and effect of a recorded file, in which a TS playback file and an EPG information file are processed together, to provide the file safely and accurately.

Additional aspects and/or advantages will be set forth in part in the description which follows and, in part, will be apparent from the description, or may be learned by practice of the invention.

In order to accomplish these aspects, there is provided a digital broadcast receiving apparatus for displaying an EPG of a recorded TS file, according to one or more embodiments, which includes a broadcasting signal processing unit receiving a TS transmitted from a broadcasting station, and separating the TS into more than one actual bit string, a file generating and processing unit generating a TS playback file and an EPG information file by combining the separated bit strings, or processing the TS playback file and the EPG information file into one recorded TS file, a temporary storage unit temporarily storing the generated or processed TS playback file and EPG information file, updating the TS playback file or accumulating the EPG information file, and temporarily storing the updated or accumulated TS playback file and EPG information file, and a TS file storage unit storing the recorded TS file.

In another aspect of one or more embodiments, there is provided a method of displaying an EPG of a recorded TS file, which includes receiving an actual TS file, separating and analyzing the received actual TS file, and then generating a TS playback file and an EPG information file, temporarily storing the generated TS playback file and EPG information file in a temporary storage unit, wherein the TS playback file is updated in real time and stored, and the EPG information file is accumulatively stored, and processing the finally updated TS playback file and the finally accumulated EPG information file stored in the temporary storage unit into one recorded TS file and storing the recorded TS file.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to the like elements throughout. The embodiments are described below to explain the present invention by referring to the figures.

Before describing a method of displaying an electronic program guide (EPG) of a recorded transport stream (TS) file according to one or more embodiments of the present invention, a process of generating a broadcast wave including EPG information, i.e., a transport stream (TS), and a method of extracting EPG data from the TS will be briefly described.

A digital broadcast is obtained by converting image data including video/audio data into a TS that is actual data of digital broadcasting. Here, TS is a broadcast wave or transport stream that means actual successive data for transmitting the digital broadcast.

TS is composed of a series of TS packets, and a TS packet has a length of 188 bytes. In the process of generating the TS file, actual video data and audio data, which are called elementary streams (ES), are encoded by specified encoders, respectively. In order to convert the respective ES into a packetized elementary stream (PES) packet, the ES is cut with a non-uniform size, i.e., with a variable size, through a packetizer, and a header is added to the cut ES. Then, the PES packet is cut with a fixed size, and a header is attached to the cut PES packet to convert the PES packet into a TS packet (which is composed of 188 bytes including the header). By carrying the generated TS on a frequency and transmitting the TS carried on the frequency, a digital broadcast can be realized.

The generated TS as described above is compressed in a digital broadcasting format, such as the ATSC or DVB standards, and then is transmitted to a receiving device, such as a DTV, a set top box, or the like. In this case, the transmitted TS includes not only a PES packet including video/audio ES but also PSI and PSIP sessions through the ATSC or DVB standards. A broadcasting content file (e.g., a moving image file and so on) (hereinafter referred to as a "TS playback file") is made from the PES packet including the video/audio ES, and a file for providing EPG information of the corresponding broadcasting content (hereinafter referred to as an "EPG information file") is made from the PSI and PSIP sessions.

Hereinafter, a method of displaying EPG of a recorded TS file and a recording apparatus according to an embodiment of the present invention will be described in detail.

Figure 3:
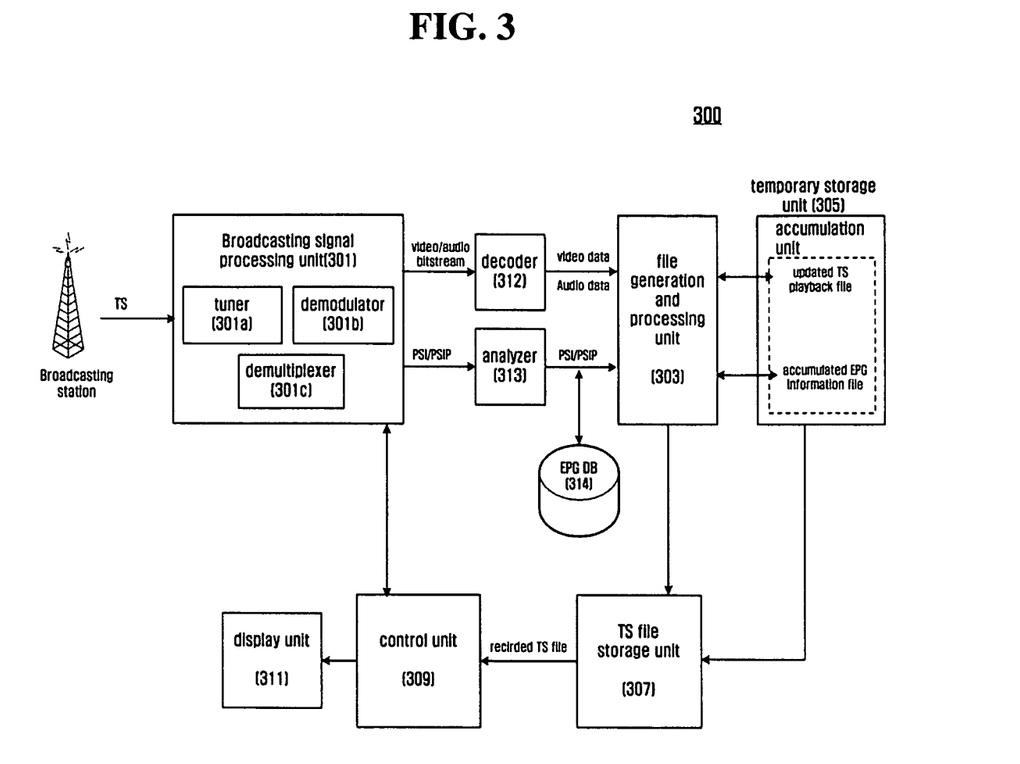
FIG. 3 illustrates a block diagram of the construction of a digital broadcast receiving apparatus for displaying an EPG of a recorded TS file according to an embodiment of the present invention.

FIG. 3 illustrates a block diagram of the construction of a digital broadcast receiving apparatus for displaying an EPG of a recorded TS file according to an embodiment of the present invention. Referring to FIG. 3, the digital broadcast receiving apparatus 300 according to an embodiment of the present invention includes a broadcasting signal processing unit 301, a file generating and processing unit 303, a temporary storage unit 305, a TS file storage unit 307, a control unit 309, and a display unit 311.

The broadcasting signal processing unit 301 includes a tuner 301a, a demodulator 301b, and a demultiplexer 301c. If an actual TS, which is transmitted from a specified broadcasting station, is received, the tuner performs synchronization with the received TS, the demodulator acquires the TS of an actual bit string, and then the demultiplexer separates the TS into a video bit stream, an audio bit stream, program specific information (PSI), a program and system information protocol (PSIP).

A decoder 312 acquires video/audio data from the separated video/audio bit stream, and an analyzer 313 analyzes the separated PSI and PSIP to construct an EPG database (DB) 314. Based on the analysis, EPG information of the corresponding broadcasting content can be acquired.

The file generating and processing unit 303 generates a TS playback file for playing the corresponding broadcasting content and an EPG information file for providing the corresponding EPG information, based on the data acquired through the decoder 312 and the analyzer 313. Here, the TS playback file may include at least one video data, at least one audio data, or both the video data and the audio data, and the EPG information file may be generated based on the data obtained by analyzing the PSI/PSIC. The generated TS playback file and the EPG information file are stored in the temporary storage unit 305, and the TS playback file and the EPG information file pre-stored in the temporary storage unit 305 are updated or accumulated by a new TS playback file and a new EPG information file which are newly generated from the file generating and processing unit 303. The updated TS playback file and the accumulated EPG information file are temporarily stored in the temporary storage unit 305 again.

In addition, when the recording is ended or interrupted and the new playback file and new EPG information file are not generated any more, the file generating and processing unit 303, if processes the finally updated TS playback file and the finally accumulated EPG information file from the temporary storage unit 305 to provide a recorded TS file, and stores the recorded TS file in the TS file storage unit 307. If a certain recorded TS file among a plurality of recorded TS files stored in the TS file storage unit is executed by a user, the recorded broadcasting content is outputted to the audio/video devices by the TS playback file, while the corresponding EPG information of the broadcasting content being currently executed is outputted to a display screen by the EPG information file.

The temporary storage unit 305, as described above, temporarily stores the TS playback files and the EPG information files generated from the file generating and processing unit 303, and continuously updates or accumulates the new TS playback files and the new EPG information files, which are transmitted in real time, to temporarily store the updated or accumulated TS playback files and EPG information files. The file update or accumulation continues until the recording of the corresponding digital broadcast is ended or interrupted.

The TS file storage unit 307, as described above, stores the recorded TS file processed by the file generating and processing unit 303. A plurality of recorded TS files may exist in the TS file storage unit 307.

The control unit 309 controls control signals generated by a user through a control button of a remote controller or other control means provided in the broadcast receiving apparatus. The user can select, play, or stop any one of the recorded TS files stored in the TS file storage unit 307 through the control unit 309.

The display unit 311 outputs the signal controlled by the user on a display means such as the display screen. The display unit 311 may be constructed to display all EPG information included in the plurality of recorded TS files even if the user does not play the file. Accordingly, all the broadcasting content recorded in the recorded TS file can be recognized even without executing the recorded TS file.

Figure 4:
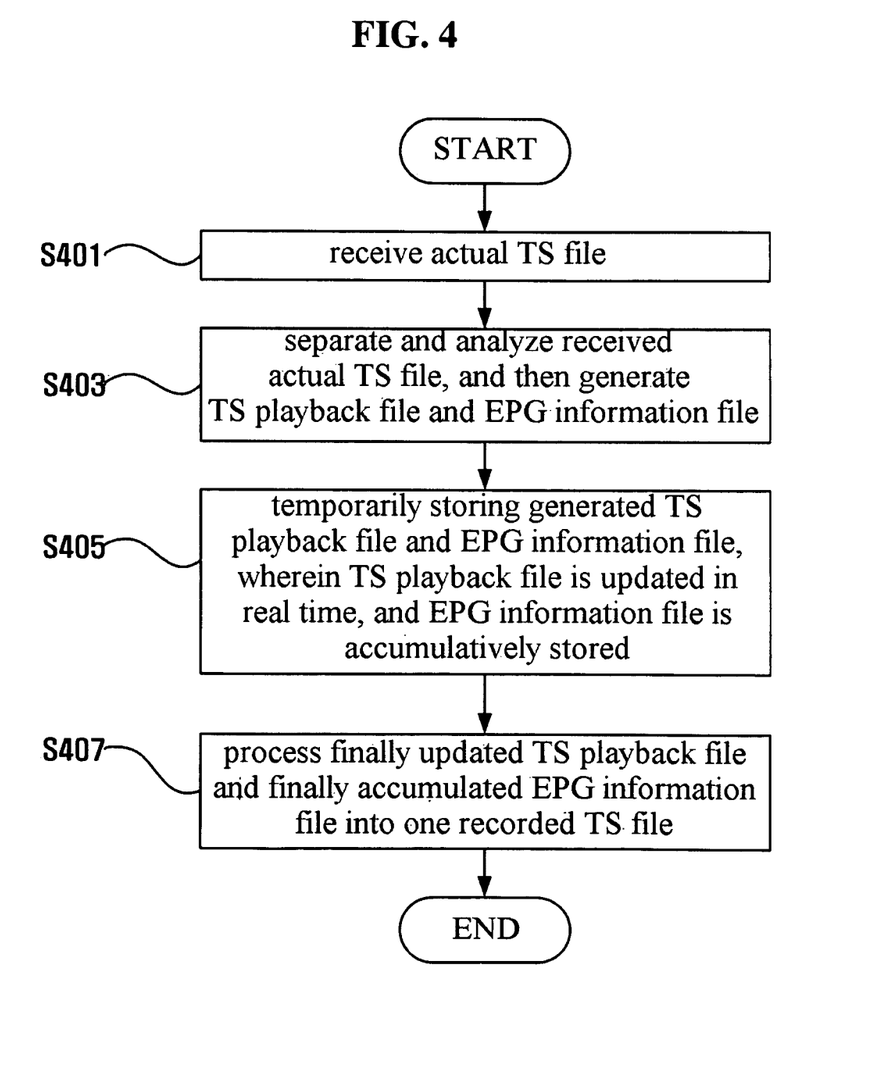
FIG. 4 illustrates a flowchart of a method of displaying an EPG of a recorded TS file according to an embodiment of the present invention.

FIG. 4 illustrates a flowchart of a method of displaying an EPG of a recorded TS file according to an embodiment of the present invention.

Referring to FIG. 4, the method of displaying an EPG of a recorded TS file according to an embodiment of the present invention includes receiving an actual TS file S401, separating and analyzing the received actual TS file, and then generating a TS playback file and an EPG information file S403, temporarily storing the generated TS playback file and EPG information file in a temporary storage unit, wherein the TS playback file is updated in real time and stored, and the EPG information file is accumulatively stored S405, and processing the finally updated TS playback file and the finally accumulated EPG information file stored in the temporary storage unit into one recorded TS file and storing the recorded TS file S407.

Figure 5:
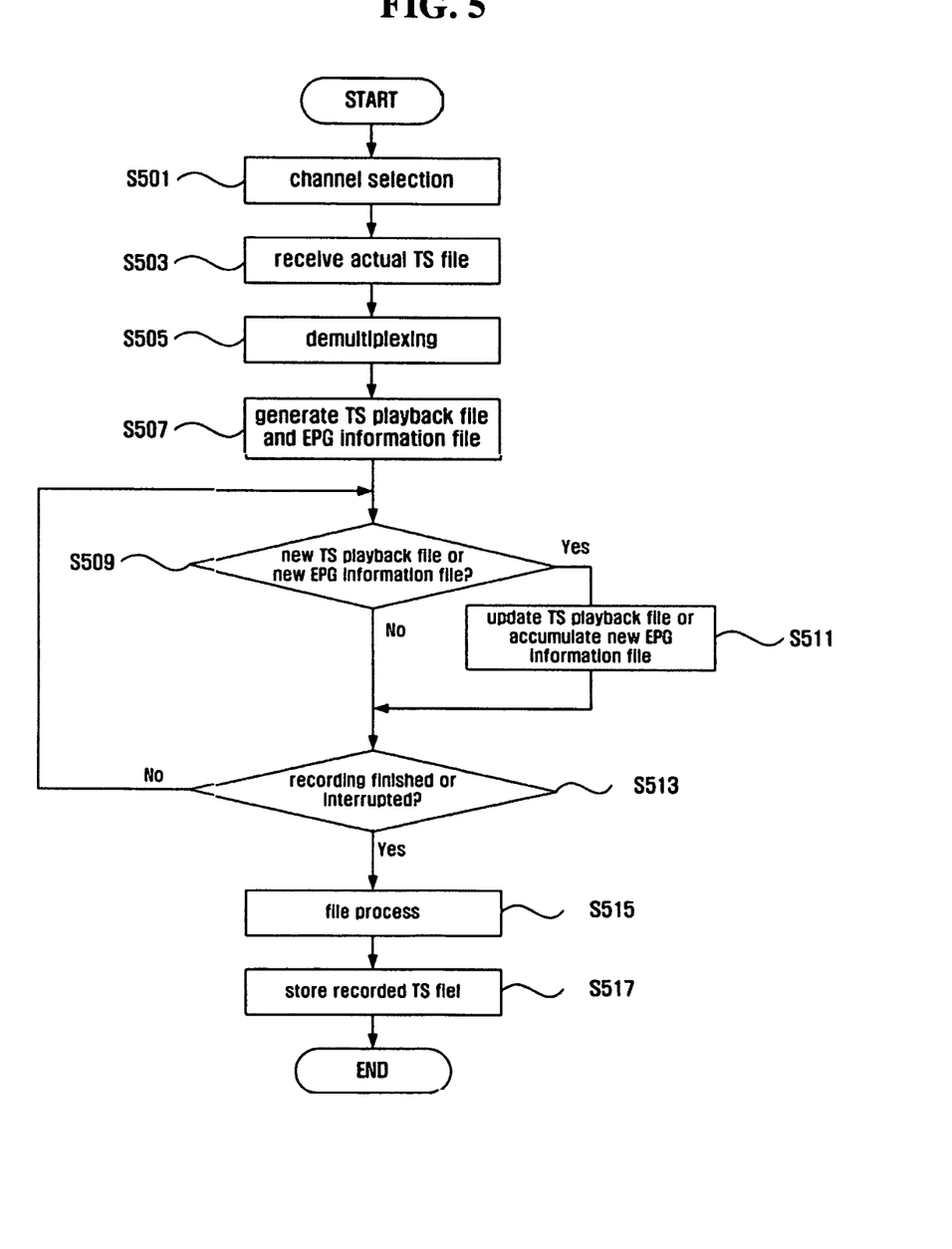
FIG. 5 illustrates a flowchart detailing the method of displaying an EPG of a recorded TS file, for example, as illustrated in FIG. 4.

FIG. 5 illustrates a flowchart detailing steps of the method of displaying an EPG of a recorded TS file, for example, as illustrated in FIG. 4.

Referring to FIGS. 4 and 5, S401 in detail, includes selecting a channel through a user S501, and receiving an actual TS file transmitted from the selected channel S503.

S403 in detail, includes dividing the received actual TS file into a video bitstream, an audio bitstream, a PSI session, and a PSIP session through a demultiplexer S505, and generating a TS playback file and an EPG information file from the separated data S507.

In this case, in S505, generating the TS playback file includes generating video data by decoding the video bitstream, generating audio data by decoding the audio bitstream, and combining the generated video/audio data. Also, in S505, generating the EPG information file includes analyzing the separated PIS session and PSIP session, extracting EPG information from the analyzed data, and combining the extracted data.

S405 in detail, includes temporarily storing the generated TS playback file and EPG information file (not illustrated), judging existence/nonexistence of a new TS playback file or a new EPG information file S509, and if the new TS playback file exists, updating the temporarily stored TS playback file and temporarily storing the updated TS playback file again, while if the new EPG information file exists, continuously accumulating the temporarily stored EPG information file and temporarily storing the accumulated EPG information again S511. If the new TS playback file does not exist, then the method advances to S513.

S407 in detail, includes judging whether the recording is ended or interrupted S513, if the recording is ended or interrupted, processing the finally updated TS playback file and the finally accumulated EPG information file into one recorded TS file S515, and storing the recorded TS file S517. If the recording is not ended or interrupted, the method returns to S509.

As described above, one recorded TS file includes the finally updated TS playback file and the EPG information file in which one or more sets of EPG information are accumulated. In other words, since the TS playback file and the EPG information file are included in one file, it is not required to separately store the TS playback file and the EPG information file, and thus the files can be managed more simply and easily.

In addition, if the screen is constructed to display the final EPG information file, in which one or more EPG information is accumulated, included in the recorded TS file, the user can recognize in advance the broadcasting content recorded in the file without executing the recorded file.

The method of displaying an EPG of a recorded TS file according to one or more embodiments of the present invention has at least one of the following effects.

Even by confirming only the finally accumulated EPG information file of the recorded TS file, all the broadcasting content recorded in the corresponding file can be easily recognized, and the custody and management of files becomes easy since other files, except for the finally accumulated EPG information file, are not used.

In addition, the method of displaying an EPG of a recorded TS file according to one or more embodiments of the present invention can be simply implemented using the existing ATSC/DVB standards without the necessity of designing an additional table.

In embodiments of the present invention, the term "unit", as used herein, may describe, but is not limited to, a hardware component, such as a Field Programmable Gate Array (FPGA) or Application Specific Integrated Circuit (ASIC), which performs certain tasks. The functionality provided for in the components and units may be combined into fewer components and modules or further separated into additional components and modules.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A digital broadcast receiving apparatus for displaying an Electronic Program Guide (EPG) of a recorded Transport Stream (TS) file, comprising:
   a broadcasting signal processing unit configured to receive a plurality of TSs transmitted from at least one broadcasting station, and separate each of the plurality of TSs into more than one actual bit string;
   a file generating and processing unit configured to generate a plurality of TS playback files and a plurality of EPG information files by combining the separated bit strings, the plurality of TS playback files and the plurality of EPG information files corresponding to the received plurality of TSs, the file generating and processing unit further configured to,
      divide each of the received plurality of TS files into separated data including a video bitstream, an audio bitstream, a PSI session, and a PSIP ession through a demultiplexer, and
      generate the plurality of TS playback files and the plurality of ERG information files from the separated data, including analyzing the PSI session and the PSIP session of the separated data extracting ERG information from the anal zed data, and combining the extracted ERG information;
   a temporary storage unit configured to temporarily store the generated TS playback files and the ERG information files, update the TS playback files in real-time, and accumulate the ERG information files through a user selection of a broadcast channel, each time the TSs are to be transmitted with a new TS playback file or a new ERG information file, respectively, and cumulatively storing the updated TS playback files and accumulated ERG information files until the recording of the transmitted TSs are ended or interrupted; and
   a TS file storage unit configured to store the updated TS playback files and accumulated ERG information files as the recorded TS file.

2. The digital broadcast receiving apparatus of claim 1, further comprising:
   a control unit configured to control the recorded TS file in accordance with generated control signals; and
   a display unit configured to display the recorded TS file controlled by the control unit.

3. The digital broadcast receiving apparatus of claim 1, wherein the broadcasting signal processing unit comprises:
   a tuner configured to synchronize receiving of the plurality of TSs;
   a demodulator configured to acquire the plurality of TSs of an actual bit string from the received TSs; and
   a demultiplexer configured to separate each of the plurality of TSs of the actual bit string into audio/video streams and EPG information.

4. The digital broadcast receiving apparatus of claim 1, wherein the file generating and processing unit is further configured to process finally updated TS playback files and finally accumulated EPG information files, which are temporarily stored in the temporary storage unit, into one recorded TS file.

5. A method of displaying an Electronic Program Guide (EPG) of a recorded Transport Stream (TS) file, comprising:
   receiving a plurality of TS files;
   separating and analyzing each of the received plurality of TS files, and then generating a plurality of new TS playback files and a plurality of new EPG information files by combining the separated bit strings, the plurality of playback files and the plurality of EPG information files corresponding to the received plurality of TSs,
      dividing each of the received plurality of TS files into separated data including a video bitstream, an audio bitstream, a PSI session, and a PSIP session through a demultiplexer, and
      generating the plurality of TS playback files and the plurality of ERG information files from the separated data, including analyzing the PSI session and the PSIP session of the separated data, extracting EPG information from the analyzed data, and combining the extracted ERG information;
   cumulatively storing the new TS playback files and the new ERG information files in a temporary storage unit until the recording of the TS files are ended or interrupted, wherein a previously temporarily stored TS playback file is updated with the new TS playback files in real-time and stored, each time the TSs is are to be transmitted, and a previously temporarily stored ERG information file is accumulated through a user selection of a broadcast channel, each time the TSs are to be transmitted with the new ERG information files; and
   processing finally updated TS playback files and finally accumulated ERG information files stored in the temporary storage unit into one recorded TS file and storing the recorded TS file.

6. The method of claim 5, wherein the receiving the plurality of TS files comprises:
   selecting a channel; and
   receiving a TS file transmitted from the selected channel.

7. The method of claim 5, wherein the generating the plurality of TS playback files comprises:
   generating video data by decoding the video bitstream;
   generating audio data by decoding the audio bitstream; and
   combining the generated video/audio data.

8. The method of claim 5, wherein the temporarily storing comprises:
   temporarily storing the generated plurality of TS playback files and the generated plurality of EPG information files; and
   updating the temporarily stored TS playback files with the new TS playback file and temporarily storing the updated TS playback files again, and accumulating the temporarily stored EPG information files with the new EPG information files, and temporarily storing the accumulated EPG information files again.

9. The method of claim 5, wherein the processing comprises:
   judging whether the recording is ended or interrupted;
   processing finally updated TS playback files and a-finally accumulated EPG information files into one recorded TS file upon judging that the recording is ended or interrupted; and
   storing the recorded TS file.

* * * * *